Jan. 26, 1926.

W. V. BAKER 1,570,720

INDUSTRIAL OVEN

Filed Dec. 11, 1924    2 Sheets-Sheet 1

Wedworth V. Baker INVENTOR

BY S. E. Thomas ATTORNEY

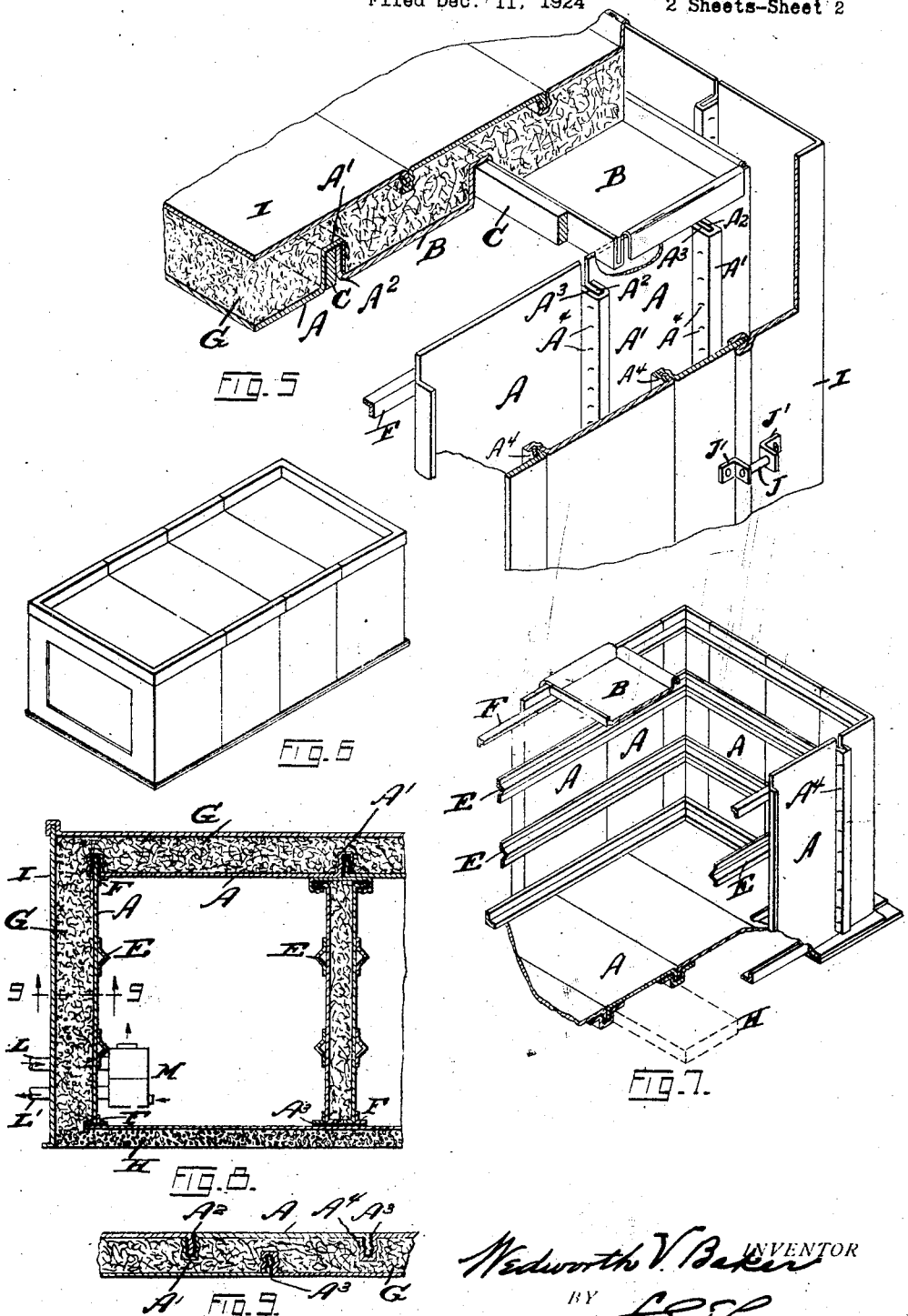

Patented Jan. 26, 1926.

1,570,720

UNITED STATES PATENT OFFICE.

WEDWORTH V. BAKER, OF DETROIT, MICHIGAN.

INDUSTRIAL OVEN.

Application filed December 11, 1924. Serial No. 755,241.

*To all whom it may concern:*

Be it known that I, WEDWORTH V. BAKER, citizen of the United States, residing at Detroit, county of Wayne, State of Michigan, have invented a certain new and useful Improvement in Industrial Ovens, and declare the following to be a full, clear, and exact description of the same, such as will enable others skilled in the art to which it pertains to make and use the same, reference being had to the accompanying drawings, which form a part of this specification.

My invention relates to an improvement in industrial ovens, shown in the accompanying drawings and more particularly described in the following specification and claims.

The purpose of my invention is to construct an oven with a steel lining covered with an insulating material which is in turn protected by a sheet metal jacket or covering. The latter however may be dispensed with if desired.

The primary object of the invention is to construct the lining in the form of panels having interlocking rib joints extending into but completely covered by an insulating blanket to prevent the oven heat from being lost through radiation.

One object in constructing the oven with interlocking rib joints is to assist in stiffening the structure,—the joints being sufficiently close to take up expansion when the oven is under heat and also to afford rigidity to the structure.

A further object of the invention lies in the means for locking the joints together by suitable depressions co-acting with corresponding projections in the adjacent interlocking portions of the joint, thereby eliminating the use of rivets or bolts for connecting the parts, unless it is desired to reinforce the joints with bars or angle irons.

A further object of the invention is to provide for reinforcing the oven walls to insure sufficient strength to support a conveyor and moving load from the roof, by the insertion of a structural bar or angle iron in the joint, thereby leaving the inner panels flush, with the projecting angles or steel conveyor supports embedded in the insulation to avoid catching dust or absorbing the heat.

A further object is to provide the joints with a packing of rubber or other suitable composition during erection which is adapted to bake as soon as the oven is sufficiently heated,—making the joint dust proof.

A further object of the invention is to connect respectively the inner sheet metal panels of the lining, and the outer sheet metal panels of the jacket together, that each may present a wall having a smooth, unitary and finished appearance on the inside and outside of the structure.

A further object in constructing the oven of a plurality of interlocking sections or panels is the facility with which an oven of any required size may be fabricated and the ease with which it may be erected.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 5 is a fragmentary perspective view with parts in section showing a detail of the roof with an insulating filling between the inner wall or lining and the outer jacket, also the side and end walls and the surrounding jacket,—the insulating filling being removed from between the walls to disclose the "locked joints" connecting the respective panels.

Figure 6 is a perspective view of an oven.

Figure 7 is a fragmentary perspective view of an open with parts broken away to show the horizontally disposed stiffening ribs extending across the several panels.

Figure 8 is a fragmentary vertical cross-sectional view through an oven showing a partition dividing the same into separate compartments.

Figure 9 is a fragmentary horizontal sectional view of a partition wall showing the staggered joints of the panels forming the surface of the wall.

Referring now to the letters of reference placed upon the drawings:

A denotes a plurality of panels forming the inner lining of the oven provided on one edge with a U-shaped or channel rib $A^1$ adapted to receive an inwardly bent flange $A^2$ on the opposite edge of a similar panel. $A^3$ indicates a filling of rubber composition lodged between the flanges of the panels which when the oven is heated forms a dust tight joint. $A^4$ designates indentations in the channel rib adapted to interlock with corresponding projections in the flange of the adjacent panel lodged therein, whereby they are secured together without rivets or bolts.

Supported upon the edges of the respective panels A are a plurality of ceiling panels B of tray-like form, having channel ends adapted to overlap the upper edge of the side wall panels A, that they may be supported thereon. The marginal side edges of the panels B are provided with an upwardly directed flange $B^2$ adapted to enter the downwardly directed channel flange $B^3$ in a like constructed adjacent panel—see Figure 5.

To stiffen and assist in supporting the roof tie bars C may be employed either in the interlocking joint of each panel, or between said joints at intervals throughout the length of the oven.

D denotes I-beams secured to the tie bar C by angle plates $D^1$ bolted thereto. The flanges of the I-beam serve as a track for a conveyor trolley,—not shown,—to convey parts to be baked to and from the oven.

E indicates longitudinal ribs which may be secured to the inner face of the panels as required to stiffen the structure, and to assist in binding the several panels together.

F, F, represent angle irons at the top and bottom of the panels embedded in a rubber composition filling to form a sealing joint at the corners formed by the side walls, roof and floor of the oven.

G denotes a blanket of rock-wool or other suitable insulating material covering the entire inner steel shell including the overlapping rib joints of the panels that they may not extend through the insulating blanket to conduct or radiate heat to the outside of the oven.

H designates a filling of concrete with an asbestos covering forming the foundation and floor for the oven.

I represents a sheet metal jacket covering the insulating blanket G,—the jointed walls of which extend inwardly interlocking in a manner similar to that of the inner lining panels. The jacket may also be held together by suitable bolts J extending through angle plates $J^1$ secured to the walls of the jacket, as shown in Figure 5.

K indicates a finishing coat of plastic material covering the jacket;—or expanded metallic lathing may be employed in place of the jacket.

L and $L^1$ respectively denote inlet and exhaust pipes leading into and from the oven, connected with a fan M, diagrammatically indicated in Figure 8.

Having now indicated the several parts by reference letters the construction and operation of the device will be readily understood.

Figure 1:
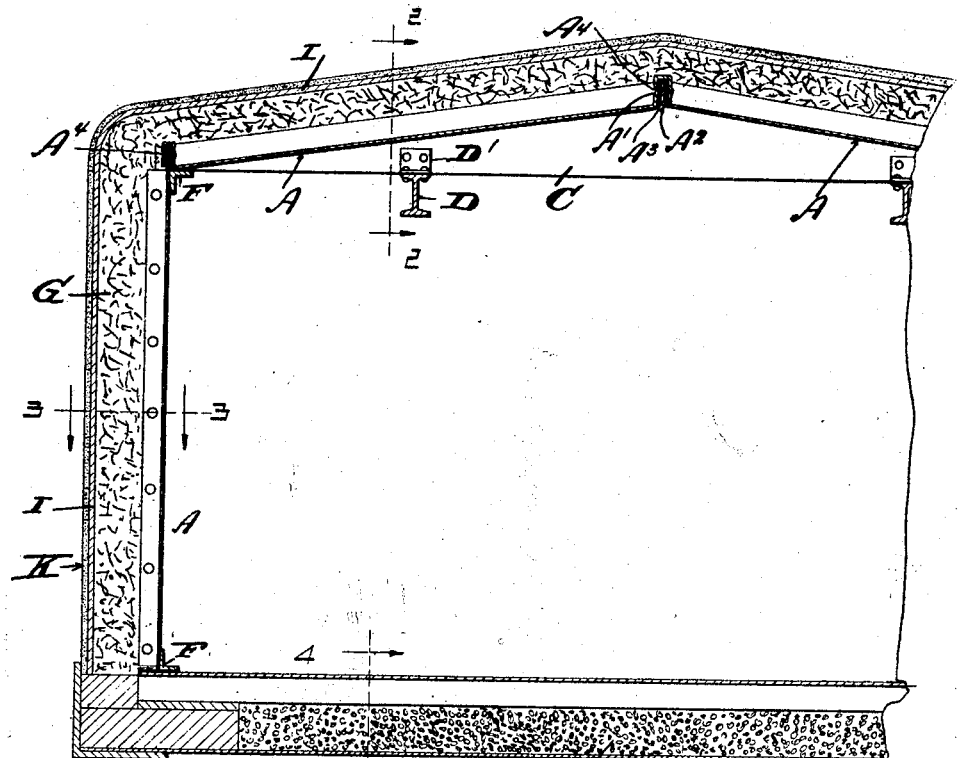
Figure 1 is a fragmentary cross-sectional view through an oven embodying my invention.
Figure 2:
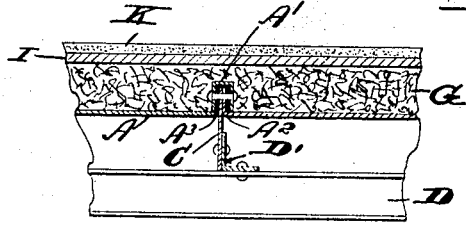
Figure 2 is a fragmentary sectional view through the roof of the oven taken on or about line 2—2 of Figure 1, showing a tie beam bolted between the joints of the roof plates to which is secured a rail for a trolley conveyor.
Figure 3:
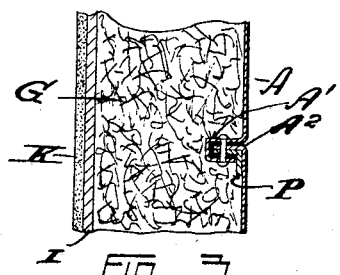
Figure 3 is an enlarged fragmentary sectional view through the side wall, taken on or about line 3—3 of Figure 2, showing the interlocking flanges of the side panels embedded in an insulating blanket with a packing of rubber composition between the flanges to insure a dust tight joint.
Figure 4:
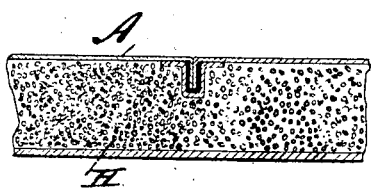
Figure 4 is an enlarged fragmentary cross-sectional view through the floor of the oven, taken on or about line 4—4 of Figure 1, showing the flanges of the panels enclosed within a channel member with a packing of rubber composition around the flanges to insure a tight joint.

It will be noted that the inner lining panels are flush, forming a smooth, even, unbroken surface,—the joints between the panels being sealed against the entry of dust. The rib joints of the side walls, are locked together by a plurality of projections in the channel walls, entering corresponding depressions in the co-acting flange of the adjacent panel. These joints constructed in the form of ribs provide sufficient strength to maintain the roof structure without other supporting members. Tie bars however may be employed between the joints of the roof lining panels from which track rails may be suspended—for a conveyor trolley— as shown in Figure 1. The side walls also may be reinforced if desired by angle irons P, lodged in the joints and bolted between the flanges of the respective panel members—as shown in Figure 3.

It will also be noted that the insulating blanket completely covers the lining and its joints so that the heat from the oven cannot be conveyed by the joints to the outside and be thus dissipated.

Having thus described my invention what I claim is:

1. In an oven, a plurality of side panels formed of sheet metal having marginal interlocking edges, a plurality of ceiling panels having their side edges interlocked, the ceiling plates having their ends bent to provide an interlocking connection with the upper ends of the side panels, and an insulating non-heat conducting blanket covering the side and ceiling panels.

2. In an oven, a plurality of side panels formed of sheet metal having marginal interlocking edges, a plurality of ceiling panels having their side edges interlocked, the ceiling plates having their ends bent to provide an interlocking connection with the upper ends of the side panels, bars connected to the ceiling panels and suspended from the interlocked connections between the ceiling panels, rails suspended from the bars, and a covering for the oven.

3. In an oven, a plurality of side panels formed of sheet metal having marginal interlocking edges, a plurality of ceiling panels having their side edges interlocked, the ceiling plates having their ends bent to provide an interlocking connection with the upper ends of the side panels, tie bars having their upper edges located in the joints between the interlocking connections of the ceiling panels and secured therein, a rail suspended from the bars, and a non-heat conducting blanket for the panels.

4. In an industrial oven; a plurality of interlocking panels formed of sheet metal provided with an outwardly bent marginal interlocking channel and a flange also bent outwardly, adapted to interlock with panels of like construction; said channel wall and flange being respectively indented to provide a locking relation between the same; ceiling panels interlocked together along their meeting edges and having their ends interlocked with the side panels, a composition filling embedded in the channels and enclosing the flange of the adjacent panel, and an insulating non-heat conducting blanket covering the panels forming said oven and their interlocking marginal joints and ribs.

5. In an industrial oven having walls ceiling and floor constructed of a plurality of panels formed of sheet metal including marginal interlocking channels and flanges bent outwardly to form stiffening ribs; tie bars lodged in the channels of the ceiling panels; rails adapted to support a trolley conveyor suspended from said tie bars, and an insulating blanket of non-heat conducting material covering the panels, ribs and interlocking joints forming said oven.

6. In an oven, a plurality of side panels formed of sheet metal having marginal interlocking edges, a plurality of ceiling panels having their side edges interlocked, the ceiling plates having their ends bent to provide an interlocking connection with the upper ends of the side panels, ribs secured to the inner faces of the side panels to strengthen the same, bars suspended from the ceiling panels, rails suspended from said bars, and a blanket for the panels.

7. In an oven, a plurality of side panels formed of sheet metal having marginal interlocking edges, a plurality of ceiling panels having their side edges interlocked, the ceiling plates having their ends bent to provide an interlocking connection with the upper ends of the side panels, tie bars having their upper edges located in the joints between the interlocking connections of the ceiling panels and secured therein, a rail suspended from the bars, a non-heat conducting blanket for the panels, a sheet metal jacket enclosing said blanket, and a finishing coat of plastic material covering the sheet metal jacket.

In testimony whereof, I sign this specification.

WEDWORTH V. BAKER..